US 6,718,758 B1

(12) United States Patent
Suzuki (10) Patent No.: US 6,718,758 B1
(45) Date of Patent: Apr. 13, 2004

(54) REGENERATIVE CATALYTIC APPARATUS IN HYBRID VEHICLE (75) Inventor: Makoto Suzuki, Mishima (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/662,731

(22) Filed: Sep. 15, 2000

(30) Foreign Application Priority Data

Sep. 20, 1999 (JP) .......................... 11-265449

(51) Int. Cl.$^7$ ................................. F01N 3/10
(52) U.S. Cl. ................ 60/300; 60/285; 60/299; 180/65.2
(58) Field of Search ................ 60/284, 295, 300, 60/320, 285, 299; 180/65.2, 65.4

(56) References Cited

U.S. PATENT DOCUMENTS

| | | | | |
|---|---|---|---|---|
| 3,986,575 | A | * 10/1976 | Eggmann | 180/66 B |
| 5,291,960 | A | * 3/1994 | Brandenburg et al. | 180/65.2 |
| 5,345,761 | A | * 9/1994 | King et al. | 60/284 |
| 5,477,676 | A | * 12/1995 | Benson et al. | 60/300 |
| 5,785,137 | A | 7/1998 | Reuyl | 180/65.2 |
| 6,067,801 | A | 5/2000 | Harada et al. | |
| 6,128,898 | A | * 10/2000 | Sakurai et al. | 60/285 |
| 6,202,782 | B1 | * 3/2001 | Hatanaka | 180/301 |

FOREIGN PATENT DOCUMENTS

| | | |
|---|---|---|
| EP | 0596854 A1 | 5/1994 |
| EP | 0922599 A2 | 6/1999 |
| JP | A-10-236147 | 9/1998 |
| JP | 11210448 | 8/1999 |

* cited by examiner

Primary Examiner—Thomas Denion
Assistant Examiner—Diem Tran
(74) Attorney, Agent, or Firm—Oliff & Berridge, PLC (57) ABSTRACT The exhaust emission of a hybrid vehicle is improved by providing a technology of achieving effective functioning of a regenerative catalytic apparatus by utilizing a feature of the hybrid vehicle of being driven by selectively operating an internal combustion engine and an auxiliary power source. The regenerative catalytic apparatus in a hybrid vehicle is provided with a hybrid mechanism for driving the vehicle by selectively operating an internal combustion engine and an auxiliary power source; an exhaust-purifying catalyst provided in an exhaust passage of the internal combustion engine for purifying exhaust flowing in the exhaust passage; and heat-storage mechanism for storing heat generated in the internal combustion engine while the internal combustion engine is in an operating state, and utilizing the stored heat to suppress decrease in the temperature of the exhaust-purifying catalyst after the internal combustion engine is stopped.

9 Claims, 4 Drawing Sheets

REGENERATIVE CATALYTIC APPARATUS IN HYBRID VEHICLE

BACKGROUND OF THE INVENTION

The present invention relates to a technology for improving exhaust emission of a hybrid vehicle that is driven by selectively utilizing an internal combustion engine and an auxiliary power source.

In recent years, internal combustion engines mounted in automobiles and the like are required to discharge the exhaust into the air after sufficiently removing harmful gas components such as carbon monoxide (CO), nitrogen oxide (NOx) and hydrocarbon (HC) that are contained in the exhaust. To satisfy the aforementioned requirement, there has been a well known technology of providing, in an exhaust passage of the internal combustion engine, an exhaust-purifying catalyst for removing the harmful gas components contained in the exhaust.

For example, such an exhaust-purifying catalyst includes a three-way catalyst that is formed by coating a surface of a ceramic carrier with alumina and carrying a platinum-rhodium-based precious metal catalytic substance on the alumina surface.

When the exhaust introduced into the three-way catalyst has an air-fuel ratio close to the stoichiometric air-fuel ratio, the three-way catalyst reacts hydrocarbon (HC) and carbon monoxide (CO) contained in the exhaust with oxygen ($O_2$) therein, thereby oxidizing hydrocarbon (HC) and carbon monoxide (CO) into water ($H_2O$) and carbon dioxide ($CO_2$). At the same time, the three-way catalyst reacts nitrogen oxide (NOx) contained in the exhaust with hydrocarbon (HC) and carbon monoxide (CO) therein, thereby reducing nitrogen oxide (NOx) into water ($H_2O$), carbon dioxide ($CO_2$) and nitrogen ($N_2$).

Such a three-way catalyst provided in the exhaust passage of the internal combustion engine removes carbon monoxide (CO), nitrogen oxide (NOx) and hydrocarbon (HC) contained in the exhaust of the internal combustion engine. Therefore, such harmful gas components can be suppressed from being discharged into the air.

The three-way catalyst is active at a predetermined active temperature (e.g., 300° C. to 500° C.) or higher. Therefore, if the temperature of the three-way catalyst is less than the predetermined temperature such as upon cold-starting of the internal combustion engine, the harmful gas components in the exhaust cannot be sufficiently removed.

In view of the foregoing problem, Japanese Laid-Open Patent Publication No. 10-236147 has proposed a regenerative catalytic apparatus. The regenerative catalytic apparatus described therein includes a honeycomb catalytic body provided within a heat-insulating container, a plurality of cylindrical heat-storage containers disposed in parallel within the catalytic body along the exhaust-flowing direction, and a heat-storage material provided in each cylindrical heat-storage container. While the internal combustion engine is in the operating state, the heat of the exhaust is stored in the heat-storage material. After the internal combustion engine is stopped, decrease in the temperature of the catalytic body is suppressed by utilizing the heat-insulation effect of the heat-insulating container and the heat stored in the heat-storage material. Thus, the catalytic body is activated early in the next starting of the engine.

In such a regenerative catalytic apparatus, the amount of heat stored in the heat-storage material depends on the operating state of the internal combustion engine. The operating state of the internal combustion engine in turn depends on the running conditions of the vehicle. Therefore, the amount of heat stored in the heat-storage material depends on the running conditions of the vehicle. Accordingly, the heat-storage material has not necessarily stored a specific amount of heat or more at the time the internal combustion engine is stopped. As a result, it may be difficult to retain the catalytic body at a specific temperature or higher until the engine is started subsequently.

In recent years, in order to reduce the fuel consumption, the amount of exhaust emission, or noise of the internal combustion engines mounted in the automobiles and the like, a hybrid vehicle has been developed, which includes two driving sources, i.e., an internal combustion engine and an electric motor, and which is driven by selectively operating the internal combustion engine and the electric motor.

In such a hybrid vehicle as well, it is important to remove harmful gas components contained in the exhaust emitted from the internal combustion engine before the exhaust is discharged into the air.

SUMMARY OF THE INVENTION

It is an object of the present invention to improve exhaust emission of a hybrid vehicle by providing a technology of achieving effective functioning of a regenerative catalytic apparatus by utilizing a feature of the hybrid vehicle of being driven by selectively operating an internal combustion engine and an auxiliary power source.

In order to achieve the object, a regenerative catalytic apparatus in a hybrid vehicle according to the present invention is provided with a hybrid mechanism for driving the vehicle by selectively operating an internal combustion engine and an auxiliary power source; an exhaust-purifying catalyst provided in an exhaust passage of the internal combustion engine for purifying exhaust flowing in the exhaust passage; and heat-storage means for storing heat generated in the internal combustion engine while the internal combustion engine is in an operating state, and utilizing the stored heat to suppress decrease in the temperature of the exhaust-purifying catalyst after the internal combustion engine is stopped.

In such a regenerative catalytic apparatus in the hybrid vehicle, the hybrid mechanism drives the vehicle only by an output of the auxiliary power source, only by an output of the internal combustion engine, or by both outputs of the internal combustion engine and the auxiliary power source, as required.

For example, when the amount of heat stored in the heat-storage means is less than a desired amount, the hybrid mechanism drives the vehicle by mainly utilizing the output of the auxiliary power source, as well as controls the operating state of the internal combustion engine so as to increase the amount of heat in the heat-storage means.

In this case, since the hybrid vehicle is driven mainly by the output of the auxiliary power source, the vehicle runs independently of the operating state of the internal combustion engine. On the other hand, the operating state of the internal combustion engine is controlled merely in order to increase the amount of heat in the heat-storage means, regardless of the running conditions of the hybrid vehicle. As a result, the heat-storage means can always store the desired amount of heat or more, irrespective of running conditions of the hybrid vehicle.

Consequently, the heat-storage means stores the desired amount of heat or more whenever the internal combustion engine is stopped. Therefore, decrease in the temperature of the exhaust-purifying catalyst can be reliably suppressed after the internal combustion engine is stopped. Thus, the exhaust emission at re-start of the internal combustion engine can be improved, as well as the fuel consumption for warming up the exhaust-purifying catalyst can be reduced.

A regenerative catalytic apparatus in a hybrid vehicle according to the present invention may be provided with a hybrid mechanism for driving the vehicle by selectively operating an internal combustion engine and an auxiliary power source; an exhaust-purifying catalyst provided in an exhaust passage of the internal combustion engine for purifying exhaust flowing in the exhaust passage; heat-storage means for storing heat generated in the internal combustion engine while the internal combustion engine is in an operating state, and utilizing the stored heat to suppress decrease in the temperature of the exhaust-purifying catalyst after the internal combustion engine is stopped; and engine control means for controlling the operating state of the internal combustion engine through the hybrid mechanism so that the amount of heat stored in the heat-storage means becomes equal to or more than a predetermined amount.

In such a regenerative catalytic apparatus in the hybrid vehicle, when the amount of heat stored in the heat-storage means is less than the predetermined amount, the engine control means controls the operating state of the internal combustion engine through the hybrid mechanism so that the heat generated in the internal combustion engine is stored in the heat-storage means.

At this time, the hybrid mechanism drives the vehicle by mainly utilizing an output of the auxiliary power source. More specifically, the hybrid mechanism controls the operating state of the internal combustion engine according to a request from the engine control means, as well as controls the auxiliary power source so as to satisfy the running conditions of the vehicle.

In this case, the hybrid vehicle is driven mainly by the output of the auxiliary power source independently of the operating state of the internal combustion engine. In other words, the operating state of the internal combustion engine is controlled merely in order to store the heat in the heat-storage means irrespective of the running conditions of the vehicle. As a result, the heat-storage means always stores the predetermined amount of heat or more, regardless of the running conditions of the vehicle. Thus, the heat-storage means stores the predetermined amount of heat or more at the time the internal combustion engine is stopped. Consequently, after the internal combustion engine is stopped, decrease in the temperature of the exhaust-purifying catalyst is prevented by the predetermined amount of heat or more stored in the heat-storage means.

The regenerative catalytic apparatus in the hybrid vehicle according to the present invention may further include temperature-detecting means for detecting a temperature of the heat-storage means. In this case, the engine control means may determine the amount of heat stored in the heat-storage means by using a detection value of the temperature-detecting means as a parameter. More specifically, the engine control means may determine that the amount of heat stored in the heat-storage means is the predetermined amount or more when the detection value of the temperature-detecting means is a predetermined value or more, and may determine that the amount of heat stored in the heat-storage means is less than the predetermined amount when the detection value of the temperature-detecting means is less than the predetermined value.

The engine control means may control the operating state of the internal combustion engine so as to increase the amount of heat generated in the internal combustion engine, when the detection value of the temperature-detecting means is less than the predetermined value. Moreover, the engine control means may control the operating state of the internal combustion engine into a normal operating state, when the detection value of the temperature-detecting means is the predetermined value or more. Further, the engine control means may be adapted to inhibit the stopping of operation of the internal combustion engine when the internal combustion engine is in the operating state and the detection value of the temperature-detecting means is less than the predetermined value, and to allow the stopping of operation of the internal combustion engine when the detection value of the temperature-detecting means is the predetermined value or more.

The heat-storage means according to the present invention may include a heat-storage material for storing heat of the exhaust emitted from the internal combustion engine. In this case, the engine control means may control the operating state of the internal combustion engine so as to increase the temperature of the exhaust emitted from the internal combustion engine, when the detection value of the temperature-detecting means is less than the predetermined value.

For example, the exhaust temperature of the internal combustion engine can be increased by retarding the ignition timing, increasing a fuel injection quantity and an intake-air quantity, or the like. Note that, in the case where the internal combustion engine is provided with a variable valve mechanism capable of varying the opening/closing timing of an exhaust valve, the exhaust temperature of the internal combustion engine may be increased by advancing the opening timing of the exhaust valve.

DESCRIPTION OF THE PREFERRED EMBODIMENTS

Hereinafter, specific embodiments of a regenerative catalytic apparatus in a hybrid vehicle according to the present invention will be described referring to the accompanying drawings.

Figure 1:
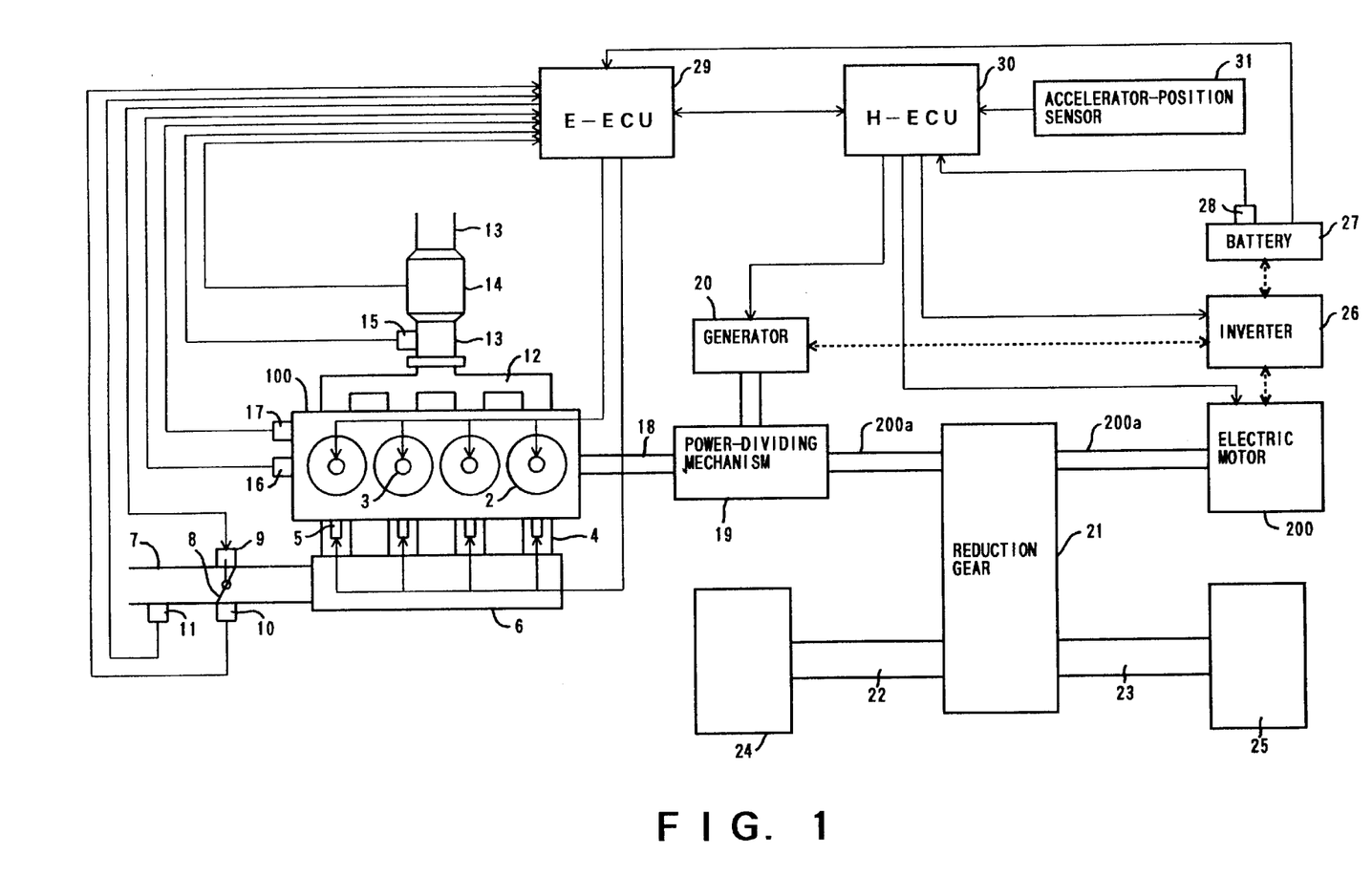
FIG. 1 is a schematic diagram showing a structure of a hybrid mechanism that is mounted in a hybrid vehicle to which a regenerative catalytic apparatus according to the present invention is applied.

FIG. 1 is a schematic diagram showing a structure of a hybrid mechanism that is mounted in a hybrid vehicle to which a regenerative catalytic apparatus according to the present invention is applied.

The hybrid mechanism shown in FIG. 1 includes two driving sources, i.e., an internal combustion engine 100 and an electric motor 200 serving as an auxiliary power source according to the present invention.

The internal combustion engine 100 is a four-cycle, four-cylinder gasoline engine. The internal combustion engine 100 is provided with spark plugs 3 that face respective combustion chambers (not shown) of cylinders 2. The internal combustion engine 100 is also provided with a crank-position sensor 16 for outputting a pulse signal every time when a crankshaft serving as an engine output shaft is rotated by a predetermined angle (e.g., 30 degrees), and a water-temperature sensor 17 for outputting an electric signal corresponding to the temperature of cooling water flowing in a water jacket (not shown) formed in the internal combustion engine 100.

Inlet branch pipes 4 are connected to the internal combustion engine 100. The inlet branch pipes 4 communicate with the respective combustion chambers of the cylinders 2 through respective inlet ports (not shown). A fuel injection valve 5 is attached to each inlet branch pipe 4 so that an injection nozzle thereof faces the corresponding inlet port.

The inlet branch pipes 4 are connected to a surge tank 6, which in turn is connected to an inlet pipe 7. A throttle valve 8 for adjusting the flow rate of the intake air flowing in the inlet pipe 7 is provided in the inlet pipe 7.

The throttle valve 8 is provided with an actuator 9 formed by a stepper motor and the like for opening and closing the throttle valve 8 according to the magnitude of an applied current, and a throttle-position sensor 10 for outputting an electric signal corresponding to the opening of the throttle valve 8.

An airflow meter 11 for outputting an electric signal corresponding to the mass of the fresh air flowing in the inlet pipe 7 is provided in the inlet pipe 7 upstream of the throttle valve 8.

Exhaust branch pipes 12 are connected to the internal combustion engine 100. The exhaust branch pipes 12 communicate with the respective combustion chambers of the cylinders 2 through respective exhaust ports (not shown). The exhaust branch pipes 12 are connected to an exhaust pipe 13, which in turn is connected to a muffler (not shown) in the downstream of the exhaust pipe 13.

Figure 2:
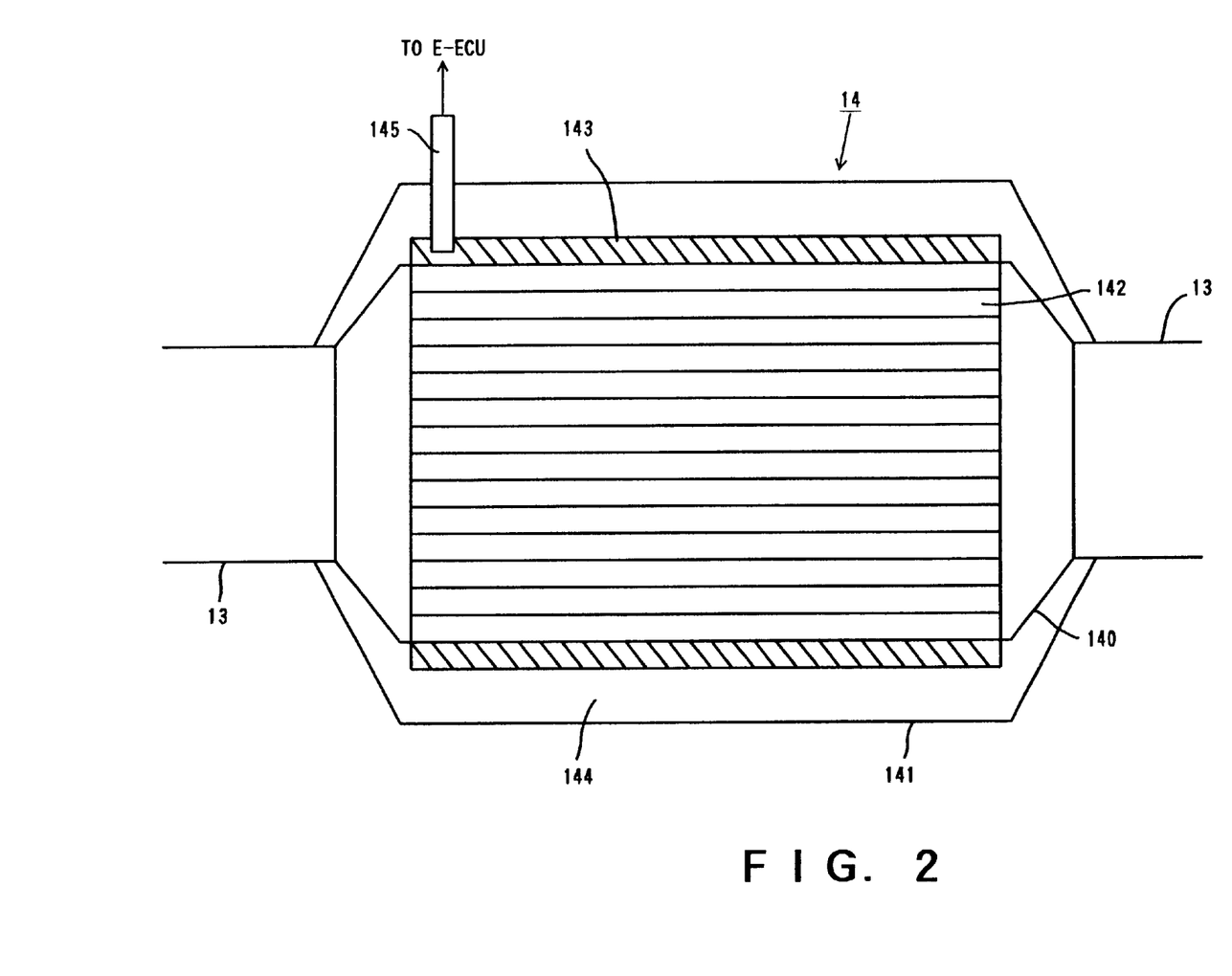
FIG. 2 is a diagram showing a structure of a regenerative exhaust-purifying mechanism.

A regenerative exhaust-purifying mechanism 14 for removing harmful gas components within the exhaust is disposed in the exhaust pipe 13. As shown in FIG. 2, the regenerative exhaust-purifying mechanism 14 is formed by a cylindrical body having a dual structure wherein an inner cylinder 140 and an outer cylinder 141 are coaxially disposed. The inner cylinder 140 is a cylindrical body having a diameter larger than that of the exhaust pipe 13. The outer cylinder 141 is a cylindrical body having an inner diameter larger than the outer diameter of the inner cylinder 140.

The inner cylinder 140 includes therein an exhaust-purifying catalyst 142 having an outer diameter that is substantially the same as the inner diameter of the inner cylinder 140. For example, the exhaust-purifying catalyst 142 may be a three-way catalyst, an occlusion reduction NOx catalyst, a selective reduction NOx catalyst, or an oxidation catalyst. The three-way catalyst will be described as an example in the present embodiment.

The three-way catalyst 142 is formed by a grid-like ceramic carrier of cordierite having a plurality of through-holes extending along the exhaust-flowing direction, and a catalytic layer that is coated over a surface of the ceramic carrier. For example, the catalytic layer is formed from a platinum-rhodium (Pt—Rh)-based precious metal catalytic substance carried on a surface of porous alumina having a plurality of pores.

The three-way catalyst 142 thus formed is activated at a predetermined temperature (e.g., 300(C) or higher. When the air-fuel ratio of the exhaust introduced into the three-way catalyst 142 is within a predetermined range (catalytic purification window) close to the stoichiometric air-fuel ratio, the three-way catalyst 142 reacts hydrocarbon (HC) and carbon monoxide (CO) contained in the exhaust with oxygen ($O_2$) therein, thereby oxidizing hydrocarbon (HC) and carbon monoxide (CO) into water ($H_2O$) and carbon dioxide ($CO_2$). At the same time, the three-way catalyst 142 reacts nitrogen oxide (NOx) in the exhaust with hydrocarbon (HC) and carbon monoxide (CO) therein, thereby reducing nitrogen oxide (NOx) into water ($H_2O$), carbon dioxide ($CO_2$) and nitrogen ($N_2$).

The inner cylinder 140 has a heat-storage material 143 on its peripheral wall. The heat-storage material 143 includes a phase-change material such as lithium chloride and sodium chloride as a base material. A vacuum space 144 is formed between the heat-storage material 143 and the outer cylinder 141 (hereinafter, the space 144 is referred to as a vacuum heat insulating layer 144). The vacuum heat insulating layer 144 may have a constant degree of vacuum. Alternatively, the degree of vacuum may be adjusted as required.

The outer cylinder 141 is provided with a heat-storage-material temperature sensor 145 for outputting an electric signal corresponding to the temperature of the heat-storage material 143. This heat-storage-material temperature sensor 145 constitutes the temperature-detecting means according to the present invention.

In such a regenerative exhaust-purifying mechanism 14, while the internal combustion engine 100 is in the operating state, the heat of the exhaust passing through the inner cylinder 140 is transmitted through a wall surface of the inner cylinder 140 to the heat-storage material 143, and stored in the heat-storage material 143.

In the regenerative exhaust-purifying mechanism 14, while the internal combustion engine 100 is stopped, the vacuum heat insulating layer 144 blocks heat radiation from the three-way catalyst 142 and the heat-storage material 143, as well as the heat stored in the heat-storage material 143 is transmitted to the three-way catalyst 142. Thus, decrease in the temperature of the three-way catalyst 142 is suppressed.

Referring back to FIG. 1, the exhaust pipe 13 is provided with an air-fuel-ratio sensor 15 upstream of the regenerative exhaust-purifying mechanism 14. The air-fuel-ratio sensor 15 outputs an electric signal corresponding to the air-fuel ratio of the exhaust introduced into the three-way catalyst 142 of the regenerative exhaust-purifying mechanism 14.

For example, the air-fuel-ratio sensor 15 is formed by a solid electrolyte portion formed from zirconia ($ZrO_2$) burned into a cylindrical shape, an outer platinum electrode covering the outer surface of the solid electrolyte portion, and an inner platinum electrode covering the inner surface of the solid electrolyte portion. When a voltage is applied between the electrodes, the air-fuel-ratio sensor 15 outputs a current of a magnitude proportional to the oxygen concentration in the exhaust gas (concentration of unburned fuel components when the air-fuel ratio is richer than the stoichiometric air-fuel ratio) resulting from migration of oxygen ions.

The crankshaft of the internal combustion engine 100 is coupled to an output shaft 18, which in turn is coupled to a power-dividing mechanism 19. The power-dividing mechanism 19 is mechanically connected to a generator 20 and a rotary shaft (motor rotary shaft) 200a of the electric motor 200.

For example, the power-dividing mechanism 19 is formed by an planetary gear that is provided with a planetary carrier rotatably carrying a pinion gear, a ring gear disposed outside the planetary carrier, and a sun gear disposed inside the planetary carrier. A rotary shaft of the planetary carrier is coupled to the output shaft 18, a rotary shaft of the ring gear is coupled to the motor rotary shaft 200*a*, and a rotary shaft of the sun gear is coupled to the generator 20.

A reduction gear 21 is coupled to the motor rotary shaft 200*a* of the electric motor 200, and wheels 24, 25 serving as driving wheels are coupled to the reduction gear 21 through respective drive shafts 22, 23. The reduction gear 21 is formed by a combination of a plurality of gears. The reduction gear 21 reduces the rotational speed of the motor rotary shaft 200*a*, and transmits the reduced rotational speed to the drive shafts 22, 23.

The generator 20 is electrically connected to an inverter 26, which in turn is electrically connected to a battery 27 and the electric motor 200.

The generator 20 is formed by an alternating-current-synchronous motor. The generator 20 generates electric power by converting kinetic energy, which is input thereto from the internal combustion engine 100 through the power-dividing mechanism 19, into electric energy in response to application of an exciting current.

The generator 20 serves as a starter motor of the internal combustion engine 100 when driving electric power is applied from the battery 27 upon starting of the internal combustion engine 100.

The battery 27 is formed by a plurality of nickel-hydrogen batteries connected in series with each other. The battery 27 is provided with an SOC (State Of Charge) controller 28 for calculating a state of charge of the battery 27 from an integrated value of the amounts of discharge current and charging current of the battery 27.

The electric motor 200 is formed by an alternating-current-synchronous motor. When the electric power generated by the generator 20 and/or the electric power of the battery 27 is applied to the electric motor 200, the electric motor 200 rotates the motor rotary shaft 200*a* with the torque corresponding to the magnitude of the applied electric power.

The electric motor 200 serves as a generator during deceleration of the vehicle, and performs so-called regenerative power generation. More specifically, the electric motor 200 converts kinetic energy transmitted from the wheels 24, 25 to the motor rotary shaft 200*a* through the drive shafts 22, 23 and the reduction gear 21 into electric energy.

The inverter 26 is a power-converting apparatus formed by a combination of a plurality of power transistors. The inverter 26 selectively performs application of the electric power generated by the generator 20 to the battery 27, application of the electric power generated by the generator 20 to the electric motor 200, application of the electric power stored in the battery 27 to the electric motor 200, and application of the electric power regenerated by the electric motor 200 to the battery 27.

In the present embodiment, the generator 20 and the electric motor 200 are each formed by the alternating-current-synchronous motor. Therefore, when the electric power generated by the generator 20 is to be applied to the battery 27, the inverter 26 converts an AC voltage generated by the generator 20 into a DC voltage, and then applies the DC voltage to the battery 27. When the electric power of the battery 27 is to be applied to the electric motor 200, the inverter 26 converts a DC voltage of the battery 27 into an AC voltage, and then applies the AC voltage to the electric motor 200. When the electric power regenerated by the electric motor 200 is to be applied to the battery 27, the inverter 26 converts an AC voltage regenerated by the electric motor 200 into a DC voltage, and then applies the DC voltage to the battery 27.

Such a hybrid mechanism is further provided with an electronic control unit (E-ECU) 29 for controlling the internal combustion engine 100, and an electronic control unit (H-ECU) 30 for generally controlling the entire hybrid mechanism.

The H-ECU 30 is connected through electric wiring to an accelerator-position sensor 31 for outputting an electric signal corresponding to the operation amount of an accelerator pedal (not shown) and the SOC controller 28. Thus, the H-ECU 30 can receive an output signal (accelerator opening signal) of the accelerator-position sensor 31 and an output signal (signal indicating the state of charge of the battery 27) of the SOC controller 28.

The H-ECU 30 is connected to the generator 20, the inverter 26 and the electric motor 200 through electric wiring, and is also connected to the E-ECU 29 through a bilateral communication line. The H-ECU 30 is capable of controlling the generator 20, the inverter 26 and the electric motor 200 based on the output signals of the accelerator-position sensor 31, the SOC controller 28 and the like, and is also capable of controlling the internal combustion engine 100 through the E-ECU 29.

For example, the H-ECU 30 starts the internal combustion engine 100 when an ignition switch is change-over from OFF to ON. More specifically, the H-ECU 30 controls the inverter 26 so as to apply the driving electric power from the battery 27 to the generator 20, thereby causing the generator 20 to serve as a starter motor. In addition, the H-ECU 30 transmits an engine-start request signal to the E-ECU 29 so as to operate the spark plugs 3, the throttle valve 8 and the fuel injection valves 5.

In this case, in the power-dividing mechanism 19, the sun gear coupled to the generator 20 is rotated, whereas the ring gear coupled to the wheels 24, 25 is stopped. Therefore, almost all of the rotational torque of the sun gear is transmitted to the planetary carrier.

The planetary carrier of the power-dividing mechanism 19 is coupled to the output shaft 18 of the internal combustion engine 100. Therefore, when the planetary carrier is rotated in response to the rotational torque of the sun gear, the output shaft 18 is also rotated correspondingly. At this time, the E-ECU 29 operates the spark plugs 3, the throttle valve 8 and the fuel injection valves 5, whereby cranking of the internal combustion engine 100 is implemented. Thus, the internal combustion engine 100 is started.

When the temperature of cooling water is raised to a predetermined temperature or higher after starting of the internal combustion engine 100, the H-ECU 30 determines that the internal combustion engine 100 has been warmed up, and transmits an engine-stop request signal to the E-ECU 29 so as to stop the internal combustion engine 100.

If the vehicle is stopped while the ignition switch is on, the H-ECU 30 transmits the engine-stop request signal to the E-ECU 29 so as to stop the internal combustion engine 100, as well as controls the inverter 26 so as to discontinue rotation of the electric motor 200.

However, there may be a case where an output signal value (signal value indicating the state of charge of the battery 27) of the SOC controller 28 is less than a predetermined reference value when the vehicle is stopped, an auxiliary machinery (such as a compressor of an in-vehicle air-conditioner) that is driven with a part of the torque output from the internal combustion engine needs to be operated, or the internal combustion engine 100 or an exhaust-purifying system needs to be warmed up. In such a case, the H-ECU 30 inhibits the internal combustion engine 100 from being stopped or transmits the engine-start request signal to the E-ECU 29 so as to restart the stopped internal combustion engine 100.

When the vehicle having been stopped is started, the H-ECU 30 controls the inverter 26 so as to apply the driving electric power from the battery 27 to the electric motor 200. When the driving electric power is supplied from the battery 27 to the electric motor 200, the motor rotary shaft 200a of the electric motor 200 is rotated. Then, the rotational torque of the motor rotary shaft 200a is transmitted to the wheels 24, 25 through the reduction gear 21 and the drive shafts 22, 23, whereby the vehicle starts moving.

Note that there may be a case where the output signal value of the SOC controller 28 is less than the predetermined reference value when the vehicle is started, the auxiliary machinery such as the compressor of the air-conditioner needs to be operated, or the internal combustion engine 100 or the exhaust-purifying system needs to be warmed up. In such a case, the H-ECU 30 transmits the engine-start request signal to the E-ECU 29 so as to start the internal combustion engine 100.

When the internal combustion engine 100 is started in order to charge the battery 27, operate the auxiliary machinery, or warm up the internal combustion engine 100 or the exhaust-purifying system upon starting the vehicle, the H-ECU 30 controls the inverter 26 so as to apply the exciting current from the battery 27 to the generator 20, thus causing the generator 20 to operate as a generator.

In this case, the output shaft 18 is rotated by the torque that is output from the internal combustion engine 100. The rotational torque of the output shaft 18 is transmitted to the planetary carrier of the power-dividing mechanism 19, and distributed from the planetary carrier to the sun gear and the ring gear.

The rotational torque distributed from the planetary carrier to the sun gear is transmitted to the generator 20 coupled to the sun gear. The generator 20 generates electric power by converting the kinetic energy transmitted from the sun gear into electric energy. The electric power generated by the generator 20 is distributed to the battery 27 and the electric motor 200 by the inverter 26.

The rotational torque distributed from the planetary carrier to the ring gear is transmitted to the motor rotary shaft 200a coupled to the ring gear.

As a result, the motor rotary shaft 200a is rotated by the torque output from the electric motor 200 plus the rotational torque transmitted from the ring gear. The rotational torque of the motor rotary shaft 200a is transmitted to the wheels 24, 25 through the reduction gear 21 and the drive shafts 22, 23.

When the state of the vehicle is shifted from starting to the normal running, the H-ECU 30 controls the E-ECU 29 so as to render the torque output from the internal combustion engine 100 at desired target torque. In addition, the H-ECU 30 stops supplying the driving electric power from the battery 27 to the electric motor 200, and controls the inverter 26 so as to apply the exciting current from the battery 27 to the generator 20.

More specifically, the H-ECU 30 calculates driving torque required by the driver (hereinafter, referred to as required driving torque) from an output signal (accelerator opening) of the accelerator-position sensor 31 and an output signal (vehicle speed) of a vehicle-speed sensor (not shown). Then, the H-ECU 30 determines the torque to be output from the internal combustion engine 100 (hereinafter referred to as required engine torque) and the torque to be output from the electric motor 200 (hereinafter referred to as a required motor torque) in order to satisfy the required driving torque.

The H-ECU 30 transmits the required engine torque to the E-ECU 29, as well as controls the inverter 26 according to the required motor torque. At this time, the H-ECU 30 controls the revolution speed of the generator 20 by adjusting the magnitude of the exciting current applied to the generator 20. Thus, the H-ECU 30 controls the revolution speed (hereinafter, also referred to as engine speed) of the internal combustion engine 100.

For example, the required engine torque transmitted from the H-ECU 30 to the E-ECU 29 is a value obtained by using the intake-air quantity and revolution speed of the internal combustion engine 100 as parameters. In this case, the H-ECU 30 has a map indicating the relation between the intake-air quantity, engine speed and engine torque. The H-ECU 30 specifies from the map the intake-air quantity and engine speed corresponding to the desired engine torque, and transmits the specified intake-air quantity and engine speed to the E-ECU 29 as the required engine torque.

The E-ECU 29 determines the throttle opening, fuel injection quantity, fuel injection timing and ignition timing according to the required engine torque received from the H-ECU 30, and controls the actuator 9, the fuel injection valves 5 and the spark plugs 3 accordingly.

Note that, if the battery 27 needs to be charged during normal running of the vehicle, the H-ECU 30 controls the E-ECU 29 so as to increase the torque output from the internal combustion engine 100, as well as controls the inverter 26 so as to increase the exciting current applied from the battery 27 to the generator 20. Thus, the amount of power generation is increased while assuring the required driving torque.

During acceleration of the vehicle, the H-ECU 30 calculates the required driving torque, required engine torque and required motor torque as it does during normal running of the vehicle as described above. Then, the H-ECU 30 controls the internal combustion engine 100 through the E-ECU 29, as well as controls the electric motor 200 through the inverter 26.

The H-ECU 30 controls the inverter 26 so as to apply not only the electric power generated by the generator 20 but also the electric power of the battery 27 to the electric motor 200, thus increasing the torque output from the electric motor 200.

During deceleration or braking of the vehicle, the H-ECU 30 transmits the engine-stop request signal to the E-ECU 29 so as to stop the internal combustion engine 100 (i.e., so as to stop fuel injection control and ignition control). In addition, the H-ECU 30 controls the inverter 26 so as to stop the generator 20 and the electric motor 200.

Then, the H-ECU 30 controls the inverter 26 so as to apply the exciting current from the battery 27 to the electric motor 200. Thus, the electric motor 200 functions as a generator, and performs regenerative power generation. More specifically, the electric motor 200 converts kinetic energy transmitted from the wheels 24, 25 through the drive shafts 22, 23 and the reduction gear 21 to the motor rotary shaft 200a into electric energy. The battery 27 is charged with the electric power regenerated by the electric motor 200 through the inverter 26.

The E-ECU 29 is connected through electric wiring to various sensors such as the throttle-position sensor 10, the airflow meter 11, the air-fuel-ratio sensor 15, the crank-position sensor 16, the water-temperature sensor 17 and a heat-storage-container water-temperature sensor 38, so that the E-ECU 29 can receive respective output signals of such sensors.

The E-ECU 29 is connected through electric wiring to the spark plugs 3, the actuator 9, the fuel injection valves 5, a first control valve 35, a second control valve 36, an electric water pump 37 and the like. Thus, the E-ECU 29 performs ignition control, throttle control, fuel injection control, and heat-storage control, based on the output signals of the above-mentioned sensors and the request from the H-ECU 30.

For example, in the fuel injection control, the E-ECU 29 determines the fuel injection quantity (TAU) according to the following expression for calculating the fuel injection quantity:

$$TAU=TP * FWL * (FAF+FG) * [FASE+FAE+FOTP +FDE(D)] * FFC+TAUV$$

where
- TP: basic injection quantity;
- FWL: increased quantity for warming-up;
- FAF: air-fuel-ratio feedback correction coefficient;
- FG: air-fuel-ratio learning coefficient;
- FASE: increased quantity after starting;
- FAE: increased quantity for acceleration;
- FOTP: increased OTP quantity;
- FDE(D): increased quantity (decreased quantity) for deceleration;
- FFC: fuel-cut return correction coefficient; and
- TAUV: invalid injection time.

The E-ECU 29 determines the operating state of the internal combustion engine 100 by using the output signal values of the sensors as parameters. Based on the determined engine operating state and a map pre-stored in a ROM (Read Only Memory) within the E-ECU 29, the E-ECU 29 calculates the basic injection quantity (TP), increased quantity for warming-up (FWL), increased quantity after starting (FASE), increased quantity for acceleration (FAE), increased OTP quantity (FOTP), increased quantity for deceleration (FDE(D)), fuel-cut return correction coefficient (FFC), invalid injection time (TAUV) and the like.

Moreover, the E-ECU 29 calculates the air-fuel-ratio feedback correction coefficient (FAF) by determining whether or not the conditions of the air-fuel-ratio feedback control are satisfied.

For example, the conditions of the air-fuel-ratio feedback control are as follows: cooling water has a predetermined temperature or higher; the internal combustion engine 100 is in the non-start state; correction to increase the fuel injection quantity after starting is not executed; correction to increase the fuel injection quantity for warming-up is not executed; correction to increase the fuel injection quantity for acceleration is not executed; correction to increase the OTP quantity for preventing a component of an exhaust system such as the three-way catalyst 142 from being heated is not executed; the fuel-cut control is not executed; and the like.

If such conditions of air-fuel-ratio feedback control are not satisfied, the E-ECU 29 calculates the fuel injection quantity (TAU) by using the air-fuel-ratio feedback correction coefficient (FAF) as "1.0."

If such conditions of air-fuel-ratio feedback control are satisfied, the E-ECU 29 receives an output signal of the air-fuel-ratio sensor 15. Then, based on the received output signal and the response delay time of the air-fuel-ratio sensor 15, the E-ECU 29 determines whether an actual air-fuel ratio of the exhaust is leaner or richer than the stoichiometric air-fuel ratio.

When the E-ECU 29 determines that the actual air-fuel ratio of the exhaust is richer than the stoichiometric air-fuel ratio, the E-ECU 29 corrects the air-fuel-ratio feedback correction coefficient (FAF) so as to reduce the fuel injection quantity (TAU). On the other hand, when the E-ECU 29 determines that the actual air-fuel ratio of the exhaust is leaner than the stoichiometric air-fuel ratio, the E-ECU 29 corrects the air-fuel-ratio feedback correction coefficient (FAF) so as to increase the fuel injection quantity (TAU).

The E-ECU 29 performs upper-limit guard processing and lower-limit guard processing on the air-fuel-ratio feedback correction coefficient (FAF) thus obtained, and calculates the fuel injection quantity (TAU) by substituting the resultant air-fuel-ratio feedback correction coefficient (FAF) for the above-mentioned expression for calculating the fuel injection quantity.

In the heat-storage control, the E-ECU 29 receives an output signal value (temperature of the heat-storage material) of the heat-storage-material temperature sensor 145 of the regenerative exhaust-purifying mechanism 14, and determines whether or not the heat-storage material has at least a predetermined temperature.

If the temperature of the heat-storage material is the predetermined temperature or higher, the E-ECU 29 determines that the amount of heat stored in the heat-storage material 143 is a desired amount or more, and executes normal control. On the other hand, if the temperature of the heat-storage material is less than the predetermined temperature, the E-ECU 29 determines that the amount of heat stored in the heat-storage material 143 is less than the desired amount. Then, the E-ECU 29 controls the operating state of the internal combustion engine 100 so as to increase the amount of heat generated by the internal combustion engine 100, and specifically, to increase the temperature of the exhaust emitted from the internal combustion engine 100.

When the E-ECU 29 arbitrarily controls the operating state of the internal combustion engine 100 so as to increase the exhaust temperature, a change in the operating state of the internal combustion engine 100 may affect the running state of the vehicle, whereby drivability may possibly be degraded.

Then, in the present embodiment, the E-ECU 29 notifies the H-ECU 30 of the start to execute the heat-storage control if the operating state of the internal combustion engine 100 needs to be controlled in the heat-storage control so as to raise the exhaust temperature. The H-ECU 30 responsively idles the internal combustion engine 100, and controls the revolution speed of the generator 20 so as to drive the vehicle only with the output of the electric motor 200.

According to such control, the operating state of the internal combustion engine 100 does not affect the running state of the vehicle. Therefore, the E-ECU 29 can control the operating state of the internal combustion engine 100 independently of the running conditions of the vehicle. Accordingly, the E-ECU 29 can arbitrarily control the operating state of the internal combustion engine 100 merely in order to raise the exhaust temperature.

Hereinafter, the heat-storage control according to the present embodiment is described in detail.

Figure 3:
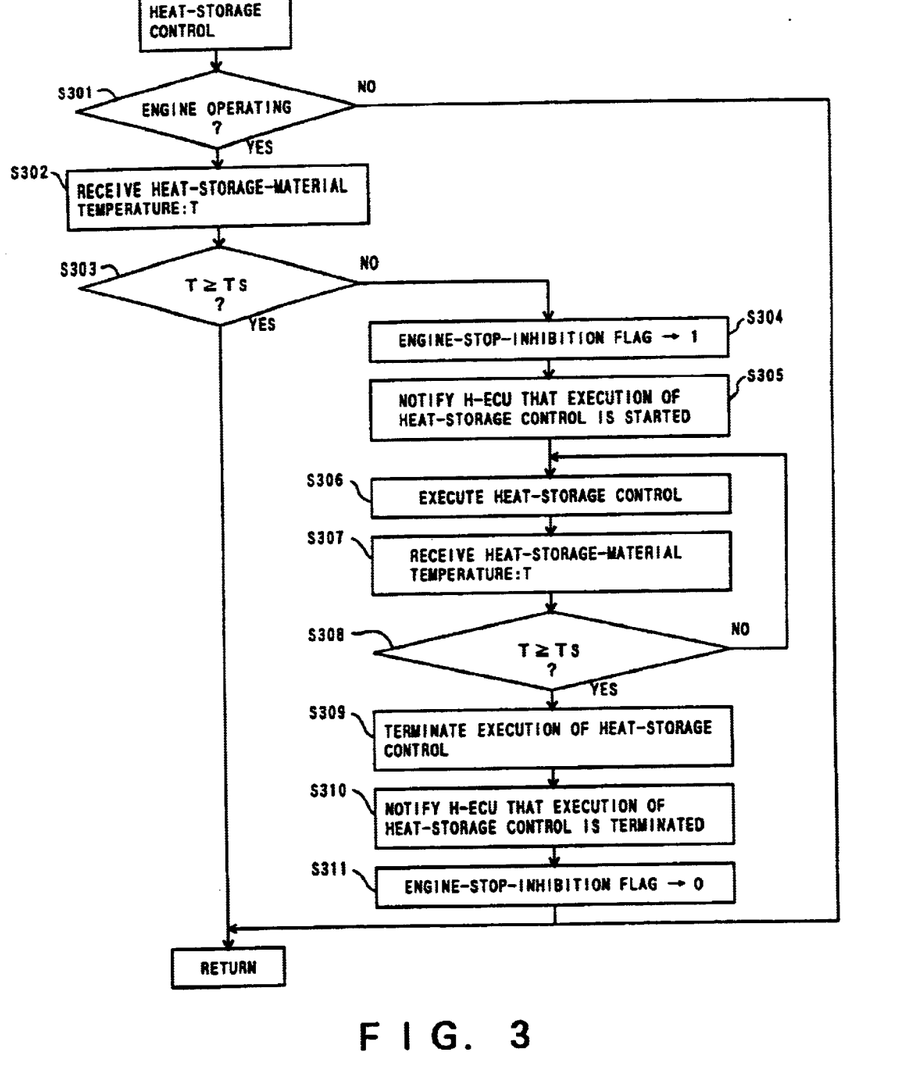
FIG. 3 is a flowchart illustrating a heat-storage control routine.

In executing the heat-storage control, the E-ECU 29 executes a heat-storage control routine as shown in FIG. 3. This heat-storage control routine is pre-stored in a storage device such as the ROM included in the E-ECU 29, and repeatedly executed by the E-ECU 29 at predetermined time intervals while the ignition switch is on.

In the heat-storage control routine, the E-ECU 29 first determines in Step S301 whether or not the internal combustion engine 100 is in the operating state.

If the E-ECU 29 determines in Step S301 that the internal combustion engine 100 is in the operating state, the E-ECU 29 proceeds to Step S302, and receives an output signal T of the heat-storage-material temperature sensor 145.

In Step S303, the E-ECU 29 determines whether or not the output signal value T of the heat-storage-material temperature sensor 145 is at least a predetermined temperature TS.

If the E-ECU 29 determines in Step S303 that the output signal value T of the heat-storage-material temperature sensor 145 is the predetermined temperature TS or higher, the E-ECU 29 terminates execution of the routine.

On the other hand, if the E-ECU 29 determines in Step S303 that the output signal value T of the heat-storage-material temperature sensor 145 is less than the predetermined temperature TS, the E-ECU 29 proceeds to Step S304.

In Step S304, the E-ECU 29 writes "1" to an engine-stop-inhibition-flag storage region that is preset in a RAM (Random Access Memory) included in the E-ECU 29. The engine-stop-inhibition-flag storage region stores "1" when the state of the regenerative exhaust-purifying mechanism 14 is in a heat-storage-control execution region, i.e., when the operating state of the internal combustion engine 100 is controlled so as to increase the amount of heat stored in the heat-storage material 143. The engine-stop-inhibition-flag storage region stores "0" when the state of the regenerative exhaust-purifying mechanism 14 is in a heat-storage-control non-execution region.

When the engine-stop-inhibition-flag storage region stores "1," the E-ECU 29 does not stop the internal combustion engine 100 even if it receives an engine-stop request from the H-ECU 30.

After executing step S304, the E-ECU 29 proceeds to Step S305, and transmits to the H-ECU 30 a signal indicating that execution of the heat-storage control is started.

In this case, the H-ECU 30 controls the hybrid mechanism so that the internal combustion engine 100 idles and that the hybrid vehicle runs with the rotational torque output from the electric motor.

More specifically, the H-ECU 30 controls the inverter 26 so as to adjust the magnitude of the exciting current applied from the battery 27 to the generator 20, thereby settling the revolution speed of the generator 20 at a predetermined value. This predetermined value is such a revolution speed that the rotational torque output from the internal combustion engine 100 (rotational torque of the output shaft 18) is no longer transmitted to the motor rotary shaft 200a in the power-dividing mechanism 19.

On the other hand, the H-ECU 30 calculates required driving torque from an output signal (accelerator opening) of the accelerator-position sensor 31 and an output signal (vehicle speed) of the vehicle-speed sensor, and regards the required driving torque thus obtained as the required motor torque. Then, the H-ECU 30 adjusts the driving electric power applied from the battery 27 or the generator 20 to the electric motor 200 so as to satisfy the required motor torque.

Referring back to FIG. 3, after executing Step S305, the E-ECU 29 proceeds to Step S306, and starts execution of the heat-storage control. In the heat-storage control, the E-ECU 29 increases the exhaust temperature and the amount of heat by increasing the engine speed and intake-air quantity, retarding the ignition timing, or the like.

In Step S307, the E-ECU 29 again receives the output signal T of the heat-storage-material temperature sensor 145.

In Step S308, the E-ECU 29 determines whether or not the output signal value T received from the heat-storage-material temperature sensor 145 in Step S307 is at least the predetermined temperature TS, i.e., whether or not the temperature of the heat-storage material 143 has increased at least to the predetermined temperature TS.

If the E-ECU 29 determines in Step S308 that the output signal value T of the heat-storage-material temperature sensor 145 is less than the predetermined temperature TS, the E-ECU 29 returns to Step S306, and continues to execute the heat-storage control.

On the other hand, if the E-ECU 29 determines in Step S308 that the output signal value T of the heat-storage-material temperature sensor 145 is the predetermined temperature TS or higher, the E-ECU 29 proceeds to Step S309, and terminates execution of the heat-storage control.

In Step S310, the E-ECU 29 transmits to the H-ECU 30 a signal indicating that execution of the heat-storage control is terminated. In this case, the H-ECU 30 controls the hybrid mechanism so as to return the operating state of the internal combustion engine 100 and the electric motor 200 to a normal operating state.

After executing Step S310, the E-ECU 29 proceeds to Step S311, and rewrites the value stored in the engine-stop-inhibition-flag storage region from "1" to "0," thereby terminating execution of the routine.

The E-ECU 29 executes the heat-storage control routine in a manner as described above, whereby an engine control means according to the present invention is implemented, and the operating state of the internal combustion engine 100 can be controlled independently of the running state of the vehicle. Therefore, irrespective of the running state of the vehicle, the operating state of the internal combustion engine 100 can be controlled so as to store the heat in the heat-storage material 143.

As a result, in the regenerative catalytic apparatus in the hybrid vehicle according to the present embodiment, a desired amount of heat or more can always be stored in the heat-storage material 143. Thus, the heat-storage material 143 stores the desired amount of heat or more whenever the internal combustion engine 100 is stopped.

Therefore, according to the regenerative catalytic apparatus in the hybrid vehicle of the present embodiment, decrease in the temperature of the three-way catalyst 142 is prevented by the sufficient amount of heat stored in the heat-storage material 143 after the internal combustion engine 100 is stopped. Thus, the three-way catalyst 142 can be retained at its active temperature or higher until the internal combustion engine 100 is restarted. As a result, the exhaust emission upon starting the internal combustion engine 100 can be improved, as well as the fuel consumption that is required to warm up the three-way catalyst 142 can be reduced.

Note that, in the present embodiment, the amount of heat stored in the heat-storage material 143 is determined by using the output signal value (temperature of the heat-storage material 143) of the heat-storage-material temperature sensor 145 as a parameter. However, it is also possible to provide instead of the heat-storage-material temperature sensor 145 a catalyst-bed temperature sensor for detecting the bed temperature of the three-way catalyst 142, and estimate the amount of heat stored in the heat-storage material 143 by using an output signal value of the catalyst-bed temperature sensor as a parameter.

Figure 4:
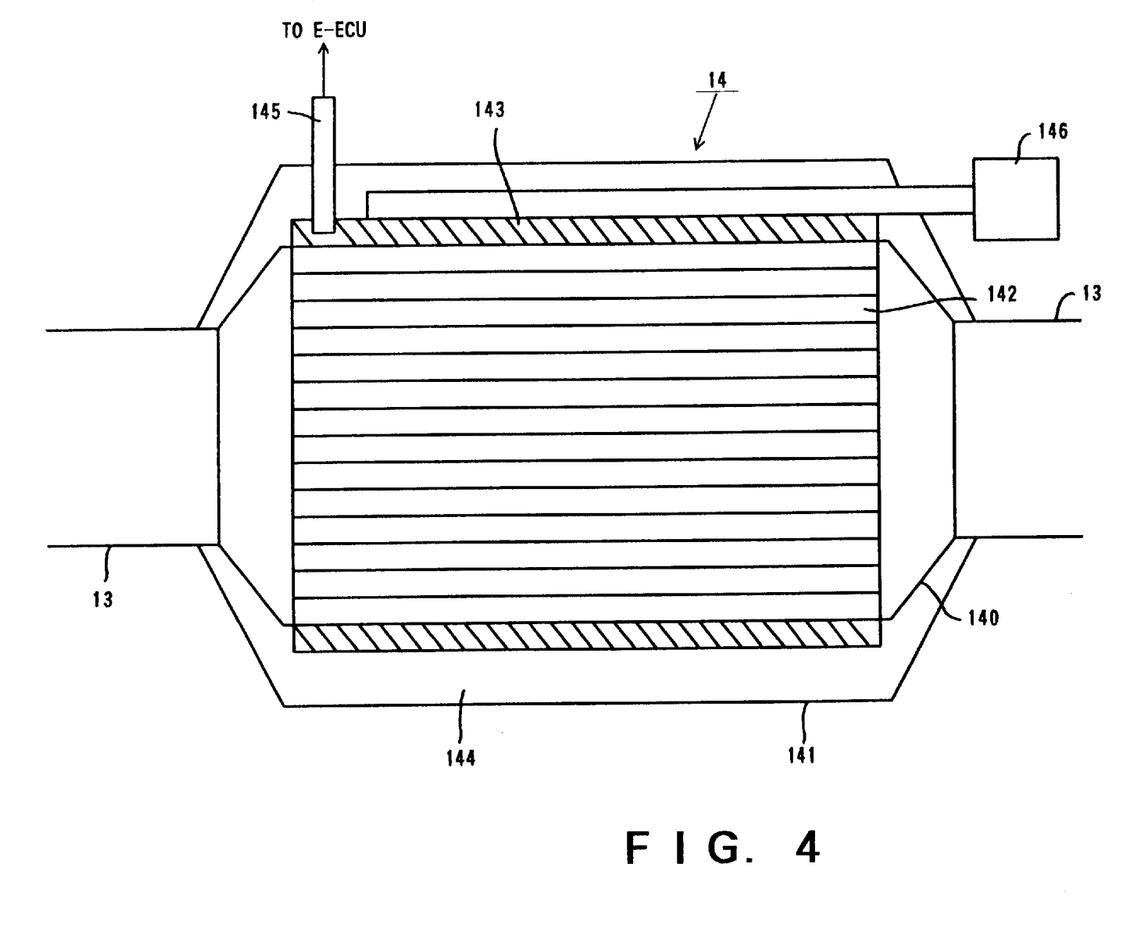
FIG. 4 is a diagram showing another embodiment of the regenerative exhaust-purifying mechanism.

Moreover, as shown in FIG. 4, the regenerative exhaust-purifying mechanism 14 may include an electric heater 146 for heating the heat-storage material 143. In this case, the electric heater 146 may be operated to heat the heat-storage material 143 and the three-way catalyst 142 only when the temperature of the heat-storage material 143 or the three-way catalyst 142 becomes less than a desired temperature, such as when the internal combustion engine 100 has been stopped for a long time.

What is claimed is:

1. A regenerative catalytic apparatus in a hybrid vehicle, comprising:

a hybrid mechanism for driving the vehicle by selectively operating an internal combustion engine and an auxiliary power source, whereby the internal combustion engine may be operated exclusively to generate heat when the auxiliary power source alone powers the vehicle;

an exhaust-purifying catalyst provided in an exhaust passage of the internal combustion engine for purifying exhaust flowing in the exhaust passage; and heat-storage means, enveloped by a vacuum layer, for storing heat generated in the internal combustion engine while the internal combustion engine is in an operating state, and utilizing the stored heat to suppress decrease in the temperature of the exhaust-purifying catalyst after the internal combustion engine is stopped, wherein the vacuum layer inhibits the radiation of heat away from the catalyst and heat storage means and transmits heat from the heat storage means to the catalyst.

2. A regenerative catalytic apparatus in a hybrid vehicle according to claim 1, wherein the heat-storage means is provided with a heat-storage material for storing heat of the exhaust emitted from the internal combustion engine.

3. A regenerative catalytic apparatus in a hybrid vehicle, comprising:

a hybrid mechanism for driving the vehicle by selectively operating an internal combustion engine and an auxiliary power source, whereby the internal combustion engine may be operated exclusively to generate heat when the auxiliary power source alone powers the vehicle;

an exhaust-purifying catalyst provided in an exhaust passage of the internal combustion engine for purifying exhaust flowing in the exhaust passage;

heat-storage means, enveloped by a vacuum layer, for storing heat generated in the internal combustion engine while the internal combustion engine is in an operating state, and utilizing the stored heat to suppress decrease in the temperature of the exhaust-purifying catalyst after the internal combustion engine is stopped, wherein the vacuum layer inhibits the radiation of heat from the catalyst and heat storage means and transmits heat from the heat storage means to the catalyst; and engine control means for controlling the operating state of the internal combustion engine through the hybrid mechanism so that an amount of heat stored in the heat-storage means becomes equal to or more than a predetermined amount.

4. A regenerative catalytic apparatus in a hybrid vehicle according to claim 2 further comprising temperature-detecting means for detecting a temperature of the heat-storage means, and wherein:

the engine control means determines the amount of heat stored in the heat-storage means by using a detection value of the temperature-detecting means as a parameter.

5. A regenerative catalytic apparatus in a hybrid vehicle according to claim 3, wherein the engine control means controls the operating state of the internal combustion engine so as to increase an amount of heat generated in the internal combustion engine when the detection value of the temperature-detecting means is less than a predetermined value, and controls the operating state of the internal combustion engine into a normal operating state when the detection value of the temperature-detecting means is equal to or more than the predetermined value.

6. A regenerative catalytic apparatus in a hybrid vehicle according to claim 3, wherein the engine control means inhibits the stopping of operation of the internal combustion engine when the internal combustion engine is in the operating state and the detection value of the temperature-detecting means is less than the predetermined temperature value, and allows the stopping of operation of the internal combustion engine when the detection value of the temperature-detecting means is the predetermined value or more.

7. A regenerative catalytic apparatus in a hybrid vehicle according to claim 2, wherein the heat-storage means is provided with a heat-storage material for storing heat of the exhaust emitted from the internal combustion engine.

8. A regenerative catalytic apparatus in a hybrid vehicle according to claim 2, wherein the internal combustion engine is controlled to idle and the vehicle is controlled to run with the rotational torque output from an electric motor when the heat-storage control is executed by the heat-storage means.

9. A regenerative catalytic apparatus in a hybrid vehicle according to claim 8, wherein the control means is to settle a revolution speed of the generator at a predetermined value by controlling adjustment of a magnitude of the exciting current applied to the generator, calculation of a required driving torque from output signals of an accelerator opening and a vehicle speed and adjustment of a driving electric power applied to the electric motor to satisfy the required driving torque regarded as a required motor torque, and the predetermined value is such a revolution speed that a rotational torque output from the internal combustion engine is no longer transmitted to a motor rotary shift.

* * * * *

UNITED STATES PATENT AND TRADEMARK OFFICE
CERTIFICATE OF CORRECTION

PATENT NO. : 6,718,758 B1
DATED : April 13, 2004
INVENTOR(S) : Makoto Suzuki

It is certified that error appears in the above-identified patent and that said Letters Patent is hereby corrected as shown below:

Title page,
Item [73], Assignee, please change "Tokyo (JP)" to -- Toyota (JP) --.

Column 16,
Lines 4, 32 and 36, please change "claim 2" to -- claim 3 --.
Lines 12 and 22, please change "claim 3" to -- claim 4 --.

Signed and Sealed this

Twenty-first Day of September, 2004

JON W. DUDAS
*Director of the United States Patent and Trademark Office*